United States Patent
Beck

[15] 3,659,748
[45] May 2, 1972

[54] METHOD AND APPARATUS FOR MAINTAINING CONSTANT THE LEVEL OF FILLING IN A CHARGING CONTAINER ARRANGED BEFORE A CONSUMING DEVICE FOR POURABLE MATERIAL, ESPECIALLY PLASTIC GRANULATE

[72] Inventor: Erich Beck, Worms-Weinsheim, Germany
[73] Assignee: Ingenieurbureau Dr. Brehm AG, Zurich, Switzerland
[22] Filed: Jan. 26, 1970
[21] Appl. No.: 5,457

[52] U.S. Cl. ................................222/56, 222/64, 222/205
[51] Int. Cl. .............................................................B67d 5/08
[58] Field of Search......................222/1, 55, 56, 57, 64, 193, 222/383, 437, 457, 479, 205, 65; 137/192, 205, 386; 272/55, 56, 57, 64, 193, 383

[56] References Cited

UNITED STATES PATENTS

| | | | |
|---|---|---|---|
| 2,511,637 | 6/1950 | Johannes | 222/205 X |
| 2,674,396 | 4/1954 | Peterson | 222/56 |
| 2,600,299 | 6/1952 | Johannes | 137/205 |
| 2,483,740 | 10/1949 | Routen | 137/205 |
| 3,002,523 | 10/1961 | Rabbitts | 137/205 |

Primary Examiner—Samuel F. Coleman
Assistant Examiner—Larry Martin
Attorney—Werner W. Kleeman

[57] ABSTRACT

There is disclosed an apparatus and method for maintaining substantially constant the level of filling of pourable material, especially plastic granulate, into a charging container arranged in front of a consuming device. Thus, there is provided a charging container having at its top region a suction pipe directed away from the charging container and therebelow a conveying conduit entering into said charging container. Operatively communicating with the suction pipe and the conveying conduit is a blower or suction device. The suction conveying installation is operated at a feeding capacity which is above the material requirements of the consuming device, and the pressure at the inlet region of the consuming device is maintained such that it does not exceed the pressure in the charging container.

14 Claims, 2 Drawing Figures

Patented May 2, 1972
3,659,748
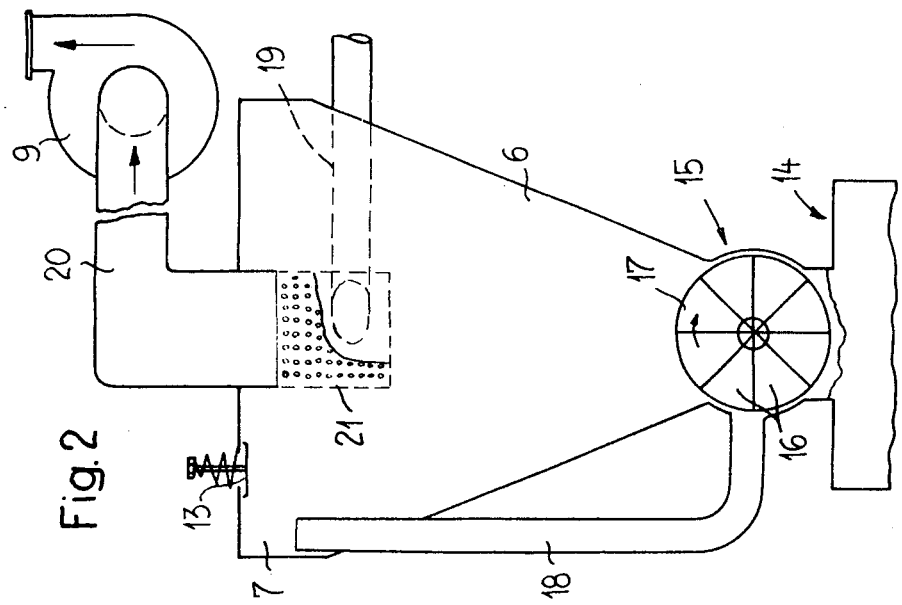
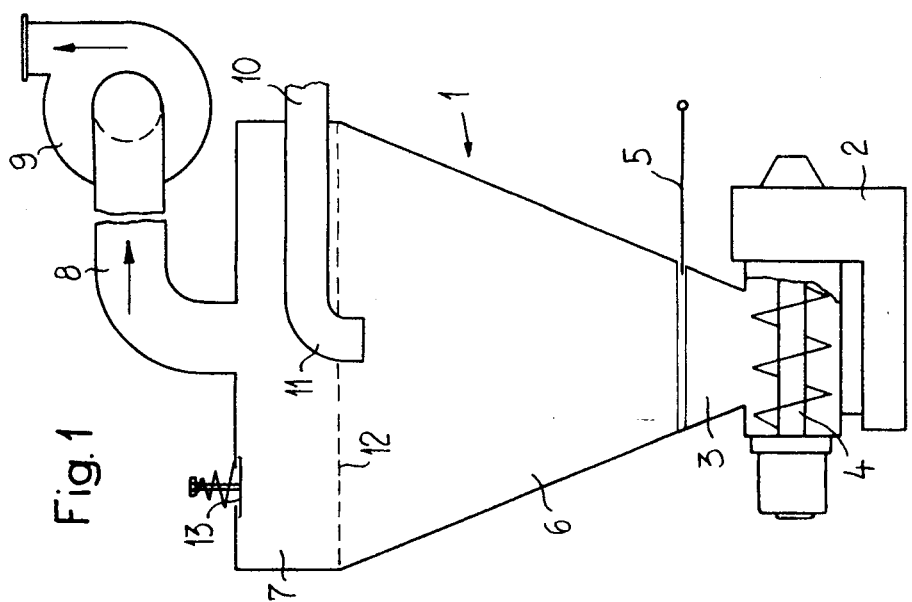
ERICH BOCK INVENTOR
BY
ATTORNEY 3,659,748

METHOD AND APPARATUS FOR MAINTAINING CONSTANT THE LEVEL OF FILLING IN A CHARGING CONTAINER ARRANGED BEFORE A CONSUMING DEVICE FOR POURABLE MATERIAL, ESPECIALLY PLASTIC GRANULATE

BACKGROUND OF THE INVENTION

The present invention relates to an improved method of and apparatus for maintaining constant the level or degree of filling of a charging container arranged in front of a consumer or load for pourable material, especially plastic granulate.

During the processing of such type materials, for instance in extruders or injection molding equipment, it is in the interest of the uniformity and quality of the finished product, when the material always enters the load or consuming device with a constant pouring density, in other words not too loose and not too compact. Therefore, attempts have been made to control the filling level or degree of filling of the charging container arranged in front of the consuming device and which is capable of being filled by pneumatic conveying, through the use of electrical or mechanical detectors in such a way that upon reaching a reference value the conveying of the material is interrupted and upon dropping below the reference value the conveying of material is again immediately placed into operation. These known types of devices are extremely expensive, cumbersome and quite subject to disturbances or breakdown.

Furthermore, there has become known to the art a charging container which is connected to a suction conveying installation and which is constructed in the form of a separator. This known type of device has a suction stud or conduit which leads from the top away from the charging container and further incorporates a conveying tube or conduit which merges into the device below the suction stud. In this arrangement a time-controlled suction blower and a discharge flap responsive to the negative pressure in the container brings about an alternate filling of the container and delivery of material to the consuming device or load. Yet, maintaining the level or degree of filling of the container constant and continuously supplying the consuming device, as is oftentimes necessary, is not possible with this type of equipment.

SUMMARY OF THE INVENTION

Accordingly, it is a primary object of the present invention to provide an improved method and apparatus of the aforementioned type which effectively overcomes the drawbacks previously discussed hereinabove.

Additionally, it is a further object of the present invention to provide an improved method which, in quite surprising manner, and without any additional control devices of an electrical and mechanical nature, renders possible maintaining the level or degree of filling of a charging container constant, and furthermore, if desired, allows for a continuous supply of a load or consuming device with material.

The inventive method resides in the features that there is employed for the charging container a separator which is of known construction and which possesses an upwardly leading away suction tube or conduit and a conveying conduit entering therebelow, such separator being operatively connected to a suction feed or conveying installation. The suction conveying or feed installation is operated at a feed capacity disposed above the material requirements of the consuming device and the pressure in the inlet zone of the consuming device is not maintained above the pressure in the charging container. Thus, upon attaining a level of filling which is somewhat above the mouth of the conveying pipe or conduit further conveying of material is automatically stopped and only then restarted when the level or degree of filling has dropped again to the opening or mouth of the conveying pipe by virtue of removal of material.

For the purpose of more exactly limiting the highest level of filling there can be arranged in known manner between the suction stud or connection and the mouth of the feed or conveying pipe in the container a sieve, impact plate or like structure.

The apparatus for carrying out the inventive method becomes extremely simple when the inlet zone merging with the charging container is sealed in pressure tight fashion towards the outside due to the construction of the load or consuming device. In another case and in accordance with further aspects of the invention, the inlet zone of the consuming device is formed by the negative pressure side of a pressure sluice arranged in front of the load or consuming device.

BRIEF DESCRIPTION OF THE DRAWING

The invention will be better understood, and objects other than those set forth above, will become apparent, when consideration is given to the following detailed description thereof. Such description makes reference to the annexed drawing wherein:

FIG. 1 is a longitudinal sectional view of a first embodiment of inventive apparatus; and FIG. 2 is a longitudinal sectional view of a second embodiment of inventive apparatus.

DETAILED DESTRIPTION OF THE DETAILED EMBODIMENTS

Describing now the drawing, it will be seen that in accordance with the arrangement of FIG. 1 the consuming device or load 2 together with its inlet zone or region 3 is directly connected to the charging container 1. The load or consuming device 2 in the present instance can be assumed to be an extruder having a conveying worm 4, which in operation and in an operationally ready condition, by virtue of its filling the inlet zone 3 with material is sufficiently pressure tight sealed. Additionally, at the outlet of the container 1 there is further arranged a blocking or locking slide member 5, or equivalent structure. The container 1 itself possesses a funnel-like lower portion 6 and a cylindrical upper portion 7. At the top region of the container 1 it will be recognized that from the central area thereof there merges away the suction pipe or conduit 8 which communicates the inner compartment of the container 1 with a suction conveying means here shown as embodying a suction blower 9.

Continuing, it will be understood that the conveying pipe or conduit 10 which leads from a nonillustrated suitable supply container extends up to the central area of the charging container and is downwardly flexed at its end mouthpiece or outlet opening region 11, as shown. Further, a baffle means here shown as a sieve 12 is installed somewhat above the mouth of the flexed or bent end piece 11 of the conveying or feed pipe 10. Finally, at the upper portion 7 of the container 1 there is additionally located a negative pressure valve 13 which limits to a suitable degree the possible negative pressure in the container 1. The suction conveying installation 8-11 is designed and dimensioned such that its feed capacity exceeds the requirement of the extruder 2.

The mode of operation of the heretofore described apparatus is as follows: Prior to setting the equipment into operation, in other words with the charging container 1 empty and with the extruder 2 empty, the slide member 5 is closed and the suction blower 9 is started into operation. Due to the negative pressure which builds up internally of the container 1 the material is sucked through the feed or conveying pipe 10 and deposits in the interior of the container 1. When the deposited material reaches the level of the mouth of the downwardly bent end 11 of the feed pipe or conduit 10 and finally exceeds same, then the infeed of material becomes more difficult and finally is stopped, latest when the material has reached the level of the sieve 12. This effect is supported by virtue of the fact that the negative pressure which prevails in the still free sectional portion of the upper region 7 of the container 1 and which negative pressure continuously increases with the difficulty of sucking material into the container 1 leads to the opening of the valve unit 13.

Now the suction blower 9 is temporarily placed out of operation and the slide member 5 at the outlet of the container lower region 6 is opened. The pressure difference between the inlet zone 3 of the extruder 2 equalizes and the material arrives at the extruder 2, which is then now placed into operation. Since the inlet zone 3 is closed sufficiently in pressure tight fashion by virtue of the material itself, the slide member 5 can remain open. The suction blower 9 is again started into operation and the container 1 filled once again, in that the suction conveying installation 8–11 is operated with a feeding or conveying capacity which exceeds the continuous delivery of material into the extruder 2. Upon reaching the maximum degree of filling, the further infeed of material is again interrupted in the previously explained manner, but is also immediately started up again when, by virtue of the consumption of the material, there occurs a dropping of the level of filling which, in turn, sufficiently frees the opening or mouth of the conveying or feed pipe 10, 11. With increasing filling of the container the delivery of material into the container is slowed down and with the filling level dropping is accelerated. In so doing, it has been found that the material tends to compactly pile up in a layer beneath the sieve 12, provided that such material is not located too far above the opening or mouth of the end piece 11 of the conveying or feed tube 10. In this manner, the degree of filling oscillates between two quite narrow limits, that is to say, during the entire operation of the extruder 2 it is maintained constant with sufficiently accuracy for practical requirements.

The mode of operation of the apparatus for a discontinuous or intermittent operation of the load or consuming device is analogous, provided that its inlet zone is only sufficiently pressure tight sealed in that the momentary discharge out of the charging container upon freeing of the mouth of the conveying tube is immediately again equalized. When using a consuming device or load, which from the outset, in other words also in the empty condition, at least is pressure tight at its inlet region or zone, then the placing into operation of such equipment is considerably simpler.

In place of the previously mentioned locking or blocking slide member 5, there can of course be used other type of structure, for instance such as a flap member. Likewise, just as was the case of briefly interrupting the suction action by placing the blower 9 out of operation, it would also be possible to interrupt this suction action by providing a flap member or equivalent structure in the suction tube 8.

Considering now the apparatus structure depicted in FIG. 2, it will be seen or at least understood that here one is concerned with a load or consuming device 14 which in itself is not sufficiently pressure tight. It is for this reason that there is arranged between the load or consuming device 14 and the container lower portion 6 a suitable bucket wheel sluice or lock 15.

The return side of the sluice 15 is used for balancing the pressure in the empty compartments 16 of the bucket wheel 17 which revolves in the direction of the indicated arrow and the negative pressure in the charging container 1 is communicated with its upper portion 7 by a conduit 18. In contrast to the first embodiment, in this case the feed or conveying pipe 19 enters tangentially, as shown, so that the separation of the conveyed material is enhanced by the centrifugal action, and the suction tube 20 is extended into the container 1 through the utilization of a sieve basket 21 or equivalent structure. Just as is the case with the first embodiment, here also at the upper region 7 of the container 1 there is provided a negative pressure valve arrangement 13.

In order to place the apparatus into operation during standstill or inoperativeness of the consuming device 14 and the bucket wheel 17 the container 1 is filled by the suction conveying installation 9, 19, 20. This occurs until filling thereof has reached the highest level after exceeding the mouth of opening of the conveying tube 19 and considerably covering the sieve basket 21. When this occurs the filling operation is interrupted. Now if the sluice 15 and the consuming device 14 are placed into operation, then the removal of the filling level in the container 1 is continuously balanced exactly as in the case of the first example or embodiment. Actually, the same also holds true here for a continuous as well as for a discontinuous mode of operation of the consuming device or load.

Of course, in accordance with the inventive method there can be used to advantage a number of consuming devices by means of a similar number of charging containers which are supplied by a common supply container or alternately from a number of supply containers, and wherein, it is readily possible to place out of operation one or the other of these loads or consuming devices. In this instance it is advantageous if the charging containers are all or in groups connected in operable association with a common suction conduit.

While there is shown and described present preferred embodiments of the invention, it is to be distinctly understood that the invention is not limited thereto but may be otherwise variously embodied and practiced within the scope of the following claims.

What is claimed is:

1. An apparatus for maintaining constant the level of filling of pourable material, especially plastic granulate, into a charging container, comprising a consuming device, a charging container arranged in front of said consuming device, a suction pipe arranged at the upper region of said charging container and directed away from said charging container, a conveying conduit means having an outlet opening disposed within the interior of said charging container, a suction conveying means communicating with said suction pipe and said conveying conduit means for drawing by suction pourable material through said conveying conduit means into said charging container, and baffle means arranged within said charging container between said suction pipe and the outlet opening of said conveying conduit means into said charging container, said pourable material upon rising at least to the level of said baffle means and after reaching a point above said outlet opening of said conveying conduit means acting as a closure for said outlet opening thereby preventing the suction from continuing to draw pourable material through said conveying conduit means into said charging container.

2. An apparatus as defined in claim 1, wherein said baffle means comprises at least one sieve member.

3. An apparatus as defined in claim 2, wherein said sieve member is constructed as a sieve basket which provides an extension of said suction pipe into the interior of said charging container.

4. An apparatus as defined in claim 3 wherein said suction pipe is centrally located at the top region of said charging container.

5. An apparatus as defined in claim 1, further including means defining an inlet region for said consuming device and which communicates with said charging container and in operation therewith is sealed in pressure tight fashion towards the outside.

6. An apparatus as defined in claim 1, wherein said conveying conduit enters into said charging container up to approximately the central region thereof and incorporates an end portion which is downwardly bent, said downwardly bent end portion containing said outlet opening which is directed away from said baffle means.

7. An apparatus defined in claim 1, wherein said conveying conduit incorporates a terminal portion which tangentially merges with said charging container.

8. Apparatus as defined in claim 1, further including valve means arranged at the upper region of said charging container which automatically limit the negative pressure.

9. An apparatus as defined in claim 1, wherein a multiplicity of charging containers are operatively connected to a common suction conduit either collectively or in groups.

10. An apparatus for maintaining constant the level of filling of pourable material, especially plastic granulate, into a charging container, comprising a consuming device, a charging container arranged in front of said consuming device, a suction pipe arranged at the upper region of said charging container and directed away from said charging container, a conveying conduit means having an outlet opening disposed within the interior of said charging container, a suction conveying means communicating with said suction pipe and said conveying conduit means, and baffle means arranged within said charging container between said suction pipe and the outlet opening of said conveying conduit means into said charging container, said consuming device incorporating means defining an inlet region, said inlet region being formed by pressure sluice means arranged in front of said consuming device at the negative pressure side thereof.

11. An apparatus as defined in claim 10, wherein said pressure sluice means forming said inlet region of said consuming device is defined by a bucket wheel sluice which incorporates empty compartments, said empty compartments defining said inlet region of said consuming device.

12. A method of maintaining substantially constant the level of filling of pourable material and ensuring for essentially uniform compaction of such pourable material, especially plastic granulate, into a charging container arranged forwardly of a consuming device, comprising the steps of: drawing by suction the pourable material into the charging container, filling the pourable material within the charging container until reaching a predetermined level within such charging container, upon reaching such predetermined level of the pourable material utilizing the attained level of the pourable material to counteract the effect of the suction and to act as a closure thereby preventing the suction from continuing to draw new material into the container to thereby shut-off the inflow of additional material into the container, withdrawing material from the container, and upon the level of the material falling below said predetermined level again generating a suction condition within the container sufficient to enable new material to be drawn into the container until reaching the aforesaid predetermined level, and continuously automatically either shutting-off the infeed of new material into the container when the pourable material has reached said predetermined level or feeding new material into the container whenever such pourable material falls below said predetermined level, to thereby maintain a constant filling level of pourable material within the container and uniform compaction of the material within the container.

13. The method as defined in claim 12, further including the step of controlling the suction drawing material into the charging container such that the feeding capacity for new material into the charging container generated by the suction effect is above the material requirements of the consuming device, and maintaining the pressure at the inlet region of the consuming device such that it does not exceed the pressure prevailing in the charging container.

14. The method as defined in claim 12, including the step of progressively throttling to shut-off the inflow of new material into the charging container owing to the progressive rise of such material within the charging container towards said predetermined level.

* * * * *